(12) United States Patent
Schrum (10) Patent No.: US 12,353,374 B1
(45) Date of Patent: Jul. 8, 2025

(54) MANAGING CHANGES TO STANDARD OBJECTS USING CUSTOM VIEWS

(71) Applicant: Oracle International Corporation, Redwood Shores, CA (US)

(72) Inventor: Allan George Schrum, Wilsall, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/406,370

(22) Filed: Jan. 8, 2024

(51) Int. Cl.
*G06F 16/215* (2019.01)
*G06F 16/23* (2019.01)

(52) U.S. Cl.
CPC ........ *G06F 16/215* (2019.01); *G06F 16/2358* (2019.01); *G06F 16/2365* (2019.01)

(58) Field of Classification Search
CPC . G06F 16/215; G06F 16/2358; G06F 16/2365
USPC ........................................................ 707/692
See application file for complete search history.

(56) References Cited

U.S. PATENT DOCUMENTS

| | | | |
|---|---|---|---|
| 10,380,094 B2 | 8/2019 | Warshavsky et al. | |
| 10,614,062 B2 | 4/2020 | Srivastava et al. | |
| 11,372,660 B2 | 6/2022 | Kwong | |
| 2010/0082538 A1* | 4/2010 | Rentsch | G06F 16/24539 707/E17.001 |
| 2011/0022431 A1* | 1/2011 | Ameling | G06Q 10/10 705/7.37 |
| 2015/0113025 A1 | 4/2015 | Hoffmann et al. | |
| 2015/0293961 A1* | 10/2015 | Migliori | G06F 16/2272 707/743 |
| 2017/0340397 A1 | 11/2017 | Smaby et al. | |
| 2019/0278862 A1 | 9/2019 | Kapoor et al. | |
| 2022/0237203 A1* | 7/2022 | Das | H04L 63/0807 |

FOREIGN PATENT DOCUMENTS

| | | |
|---|---|---|
| CN | 113656454 A | 11/2021 |
| EP | 4020248 A1 | 6/2022 |

OTHER PUBLICATIONS

"Create custom views and forms for the Azure AD User table," Retrieved from https://learn.microsoft.com/en-us/power-platform-release-plan/2022wave2/data-platform/create-custom-views-forms-aad-user-table, Apr. 28, 2023, p. 1.

(Continued)

*Primary Examiner* — Kimberly L Wilson
(74) *Attorney, Agent, or Firm* — Invoke (57) ABSTRACT

Techniques are described herein for efficiently managing and transmitting changes to a standard object within a data processing system while preserving the integrity of customer-defined custom views on that standard object. The proposed systems and methods introduce a novel approach to handling Create, Update, and Destroy (hereinafter "CUD") operations on a standard object, allowing customers to define custom views that encapsulate specific fields of interest. The systems and methods involve the creation of a replication object, triggered by changes to the standard object, which captures these alterations without storing actual data. This mechanism, coupled with the generation of change logs and transmission to a message bus, enables changes to the standard object to be performed without impacting the customer-defined views.

20 Claims, 4 Drawing Sheets

(56) References Cited

OTHER PUBLICATIONS

"Creating custom object types and custom eventtypes," Aug. 16, 2023, pp. 3.
"Sage Intacct—Tips, Tricks and Components ," Retrieved from https://www.greytrix.com/blogs/sageintacct/2020/07/24/deploy-custom-view-of-standard-object-in-sage-intacct/, Jul. 24, 2020, pp. 4.
"Schema Registry Overview," Retrieved from https://docs.confluent.io/platform/current/schema-registry/index.html, Sep. 13, 2023, pp. 5.
"System Compatibility Views (Transact-SQL)," Retrieved from https://learn.microsoft.com/en-us/sql/relational-databases/system-compatibility-views/system-compatibility-views-transact-sql?view=sql-server-ver16, May 23, 2023, pp. 2.
"Views," Retrieved from https://learn.microsoft.com/en-us/sql/relational-databases/views/views?view=sql-server-ver16, 2023, pp. 2.

\* cited by examiner

Adding a new record:

INSERT INTO foobar( ID, Reference, QueueID ) values ( 1, 'The first record', NULL );

-> INSERT INTO CO$MyFooBar( ID, Method, OldFooBarID, OldReference, OldQueueID, NewFooBarID, NewReference, NewQueueID ) VALUES ( 1234, 'CREATE', NULL, NULL, NULL, 1, 'The first record', NULL );

Updating a record:

UPDATE foobar SET Reference = 'An updated Reference', QueueID = 10 WHERE ID = 1;

-> INSERT INTO CO$MyFooBar( ID, Method, OldFooBarID, OldReference, OldQueueID, NewFooBarID, NewReference, NewQueueID ) VALUES ( 5678, 'UPDATE', 1, 'The first record', NULL, 1, 'An updated Reference', 10 );

Deleting a record:

DELETE foobar WHERE ID = 1

-> INSERT INTO CO$MyFooBar( ID, Method, OldFooBarID, OldReference, OldQueueID, NewFooBarID, NewReference, NewQueueID ) VALUES ( 5678, 'DESTROY', 1, 'An updated Reference', 10, NULL, NULL, NULL );

MANAGING CHANGES TO STANDARD OBJECTS USING CUSTOM VIEWS

TECHNICAL FIELD

The present disclosure relates to data processing systems, and more specifically, to methods for managing changes to standard objects in a data processing system using custom views.

BACKGROUND

In the evolving landscape of data processing systems, the need for efficient management of standard object updates while preserving downstream processes has become increasingly pronounced. The problem can be associated with many different data processing systems that define an object which is then exposed to a customer for use. In such cases, exposing an object for a customer to use results in the creation of a public Application Programming Interface (hereinafter "API"). The maintainer of the system defines the rules for information coming in and out of the system, and allows the customer to connect directly to databases with rigid table schemas. Such tables have a set number of columns with specific sizes, and other well-defined specifications. This creates a form of contract with the customer, where the customer is implicitly assured that they will be able to access this information on a repeatable basis. However, this contract comes into direct conflict with the maintainer's needs as a product owner to improve the product, fix defects, and expand offerings. At times, the maintainer may wish to add a column to a database table, drop a column, or change the value type of a particular column in a table, for example. This contract is implicitly violated every time such an action is performed that changes the structure of a standard object.

When this occurs, a customer's integration may potentially break. In some cases, the direct access Structured Query Language (hereinafter "SQL") the customer uses to access the information may no longer work properly. Disruptions may affect the public API, accessed through either Representational State Transfer ("REST") or Simple Object Access Protocol ("SOAP") APIs. These APIs are distinct web service communication protocols which allow customers to interact with the system. Alterations to the standard object may impact the functionality of these APIs, leading to disruptions in data retrieval and manipulation. As the shape of the document changes, unexpected results may therefore occur, leading to the code on the customer's side ceasing to function properly.

There is thus a need to fix this problem so that there is a way to exchange data that doesn't break such integrations. Public APIs have a common way of "versioning" to deal with this. Under versioning, version 1 of an API may define an object in the way it was originally defined, while version 2 of the API has a new object definition. Customers are then told to change their code to adopt the version 2 API, in order to adopt the changes that were made to the object definitions. Providers then say to customers that they will support the old version for a period of time, but the customer will need to uptake the new version after that. While this may work for APIs to an extent, it is often unworkable for database schemas. The challenge is that any change to a column requires a change to the SQL relating to that column, meaning the customer must change their code for each such change.

One approach for solving this problem is allowing a customer to "create a view". A customer may then have an 'old' view that represents the old object, and a 'new' view that represents the new object, and an attempt is made to maintain some amount of compatibility between the old and the new views. This sometimes may work, but often does not, as it requires the provider to create that 'new' view and maintain it, in trying to not break the object associated with those object definitions.

There is also a need to resolve this issue in cases where data is being streamed out of the data processing system. That is, there are message buses that allow data to be taken from various sources and published onto the message bus. Someone downstream can then subscribe to that and read the message. Such a system may be known as a "publish and subscribe" system. A solution is needed such that pushing changes to an object does not result in a customer's view of that streaming data failing to work. The challenge lies in maintaining synchronization between the standard object and customer-defined views, especially when changes to the former should reflect in the latter without compromising the integrity of the customer's business processes. The current solutions often fall short in providing an efficient mechanism for updating standard objects while concurrently supporting customer-defined views.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present disclosure.

1. General Overview

Techniques are described herein for efficiently managing and transmitting changes to a standard object within a data processing system while preserving the integrity of customer-defined custom views on that standard object. The proposed systems and methods introduce a novel approach to handling Create, Update, and Destroy (hereinafter "CUD") operations on a standard object, allowing customers to define custom views that encapsulate specific fields of interest. The systems and methods involve the creation of a replication object, triggered by changes to the standard object, which captures these alterations without storing actual data. This mechanism, coupled with the generation of change logs and transmission to a message bus, enables changes to the standard object to be performed without impacting the customer-defined views.

One or more embodiments described in this Specification and/or recited in the claims may not be included in this General Overview section.

2. Architectural Overview

Figure 1:
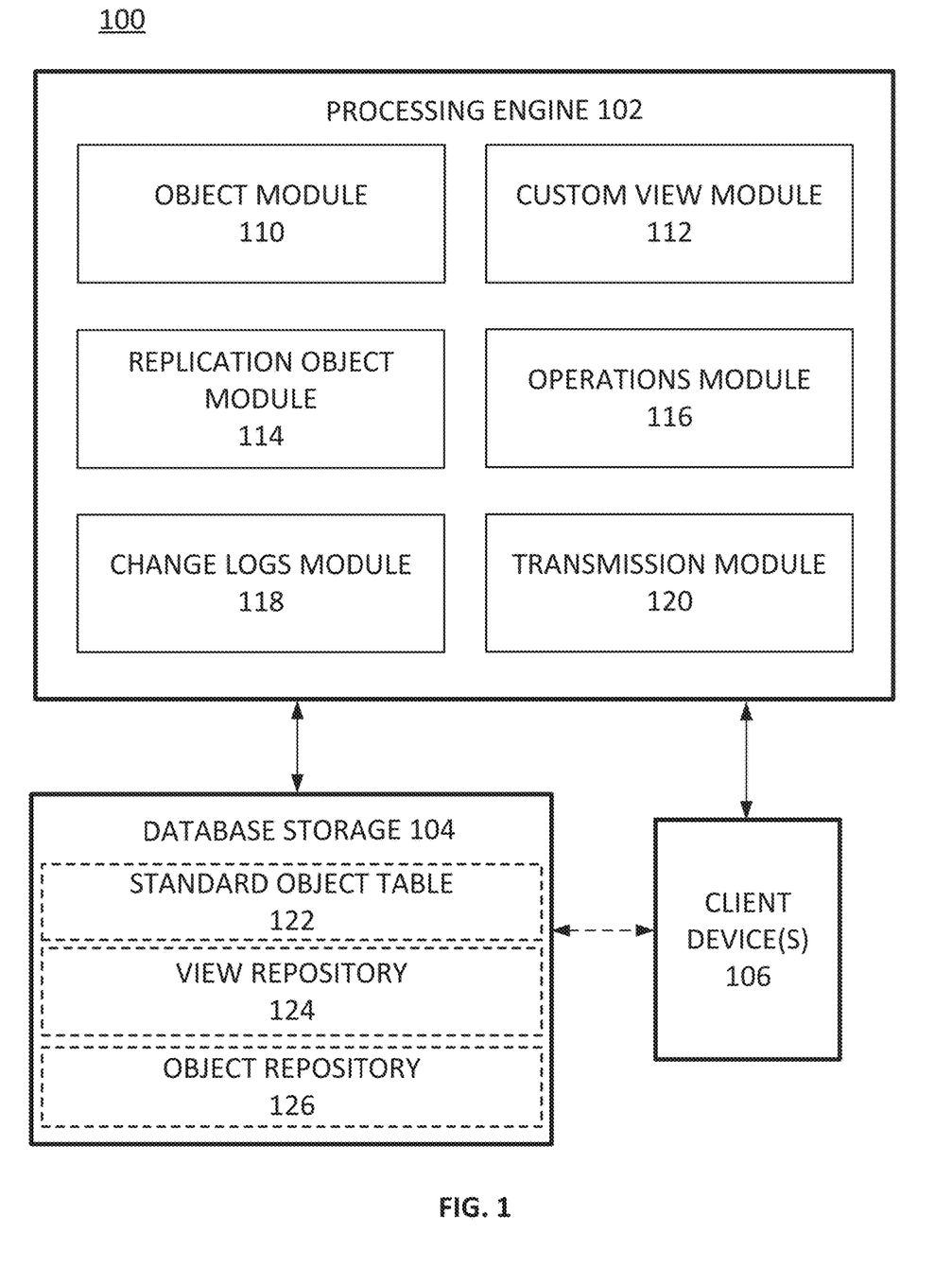
FIG. 1 illustrates a system in accordance with some embodiments.

FIG. 1 illustrates an exemplary system 100 in accordance with some embodiments. As illustrated in FIG. 1, the system 100 includes processing engine 102, database storage 104, and client device(s) 106. In the system 100, one or more client device(s) 106 are connected to a processing engine 102 and a database storage 104. The processing engine 102 is connected to the database storage 104, and optionally connected to one or more repositories and/or databases, including, e.g., a standard object table 122, a view repository 124, and/or an object repository 126. One or more of the databases may be combined or split into multiple databases. The client device(s) 106 in this environment may be one or more computers, and the processing engine 102 may be an application or software hosted on a computer or multiple computers which are communicatively coupled via remote server or locally.

In one or more embodiments, system 100 may include more or fewer components than the components illustrated in FIG. 1. The components illustrated in FIG. 1 may be local to or remote from each other. The components of processing engine 102, database storage 104, and/or client device(s) 106 may be distributed over multiple applications and/or machines. Multiple components may be combined into one application and/or machine. Operations described with respect to one component may instead be performed by another component.

Figure 2:
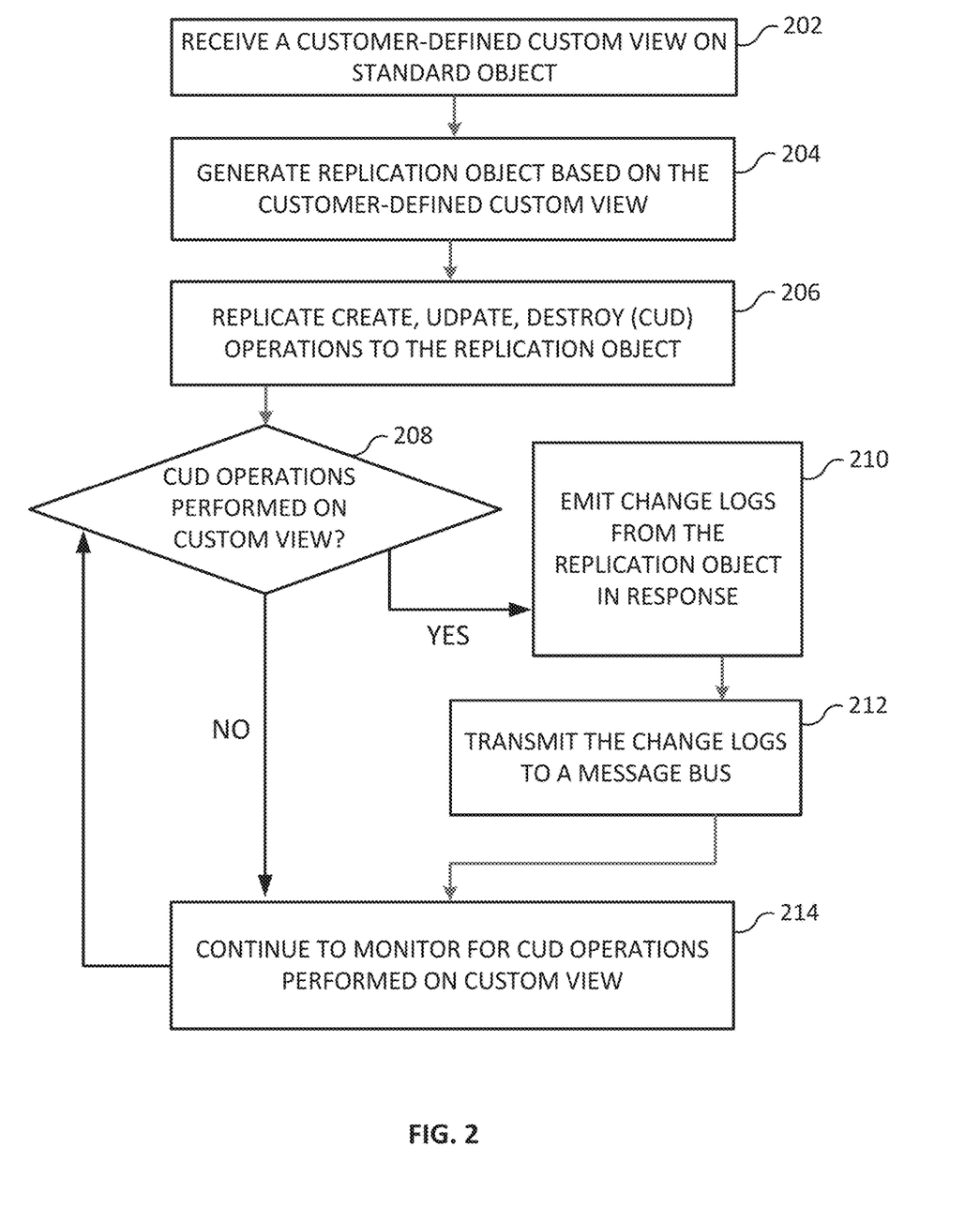
FIG. 2 illustrates an example set of operations for managing changes to a standard object using a custom view, in accordance with some embodiments.

In one or more embodiments, processing engine 102 may perform the exemplary method of FIG. 2 or other method herein and, as a result, manage changes to standard objects in a data processing system using custom views. In some embodiments, this may be accomplished via communication with the client device(s) 106, database storage 104, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Within the processing engine 102, object module 110 functions to provide a standard object within a data processing system, where changes to the standard object affect downstream processes. The object module 110 operates to instantiate and manage standard objects within the data processing system. This module ensures that any alterations made to the standard object trigger effects on downstream processes. The instantiation process involves configuring the standard object with attributes and behaviors relevant to its intended functionality. The object module 110 lays the groundwork for subsequent operations, facilitating the seamless integration of standard objects into the broader data processing system. This integration ensures that any changes to the standard object propagate through downstream processes.

Custom view module 112 functions to receive a customer-defined custom view on the standard object, where the custom view encapsulates selected fields of the standard object. The custom view module 112 receives and processes customer-defined custom views on the standard object. By interfacing with a user-friendly interface, the custom view module 112 enables customers to define their unique perspectives on the standard object. Customers can select specific fields of interest, tailoring the standard object to their specific use cases.

Replication object module 114 functions to generate a replication object based on the customer-defined view, the replication object being configured to capture changes without storing actual data. The replication object module 114 serves to implement a replication object based on the customer-defined view. The replication object captures changes to the standard object without the need to store actual data, offering a more resource-efficient approach. By utilizing technologies supporting change data capture, such as log-based replication, trigger-based replication, or transaction-based replication, the replication object module 114 ensures an accurate record of modifications to the standard object.

Operations module 116 functions to replicate Create, Update, and Destroy (hereinafter "CUD") operations to the replication object, ensuring synchronization between the standard object and the customer-defined view on the standard object. In some embodiments, the operations module 116 utilizes application code that replicates CUD operations to the previously mentioned replication object. By doing so, the operations module 116 guarantees the synchronization between the standard object and the customer-defined view on the standard object. This synchronization helps maintain a representation of the standard object, reflecting any changes introduced through CUD operations in real-time. The operations module 116 thus allows the system to respond to alterations in the standard object while ensuring that the customer-defined view accurately encapsulates these changes.

Change logs module 118 functions to emit change logs from the replication object in response to CUD operations on the standard table, wherein the change logs capture changes to the standard object. The change logs module 118 helps track and document changes within the standard object. The change logs module may emit change logs originating from the replication object in response to CUD operations executed on the standard table. These change logs help capture and record alterations to the standard object. By systematically documenting each CUD operation, the change logs module 118 provides a record of the standard object's evolution. This detailed and real-time documentation facilitates updates and allows downstream systems to stay synchronized with the evolving state of the standard object.

Transmission module 120 functions to transmit the change logs to a message bus for consumption by downstream systems, enabling one or more real-time updates to the standard object without affecting the customer-defined view. The transmission module 120 facilitates the dissemination of change logs generated by the change logs module 118. The transmission module 120 may transmit these change logs to a message bus, thereby making them accessible for consumption by downstream systems. This transmission mechanism facilitates real-time updates to the standard object without impacting the customer-defined view. By relaying the change logs to the message bus, the transmission module 120 ensures that downstream systems can integrate with and respond to the evolving state of the standard object.

In some embodiments, client device(s) 106 are one or more computing devices that are connected to a computer network. A computing device generally refers to any hardware device that includes a processor. A computing device may refer to a physical device executing an application or a virtual machine. Examples of computing devices include, e.g., a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator ("NAT"), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, each of the client device(s) are associated with a respective set of computing resources. Computing resources may comprise, e.g., software and/or hardware resources used in the execution of one or more applications by the associated host. Example computing resources may include, e.g., central processing units ("CPUs"), network ports, database connections, user sessions, memory, operating systems, application instances, and virtual machine instances. Additionally or alternatively, a host may include other computing resources, which may vary from one host to the next. In some embodiments, the processing engine 102 may be hosted in whole or in part as an application or web service executed on the client device(s) 106. In some embodiments, one or more of the database storage 104, processing engine 102, and client device(s) 106 may be the same device.

In various embodiments, database storage 104 constitutes optional repositories which can include one or more of, e.g., a standard object table 122 representing a definition of a standard object in database table format; a view repository 124 representing a number of customer-defined custom views of objects; and an object repository 126 representing a number of defined objects within the data processing system. The optional database(s) may also store and/or maintain any other suitable information for the processing engine 102 to perform elements of the methods and systems herein. In some embodiments, the optional database(s) can be queried by one or more components of system 100 (e.g., by the processing engine 102), and specific stored data in the database(s) can be retrieved.

In some embodiments, one or more components of system 100, including processing engine 102, may be implemented as or integrated into a cloud service, such as a software-as-a-service ("SaaS") or a platform-as-a-service ("PaaS").

3. Managing Changes to Objects Using Custom Views

FIG. 2 illustrates an example set of operations for managing changes to a standard object using a custom view, in accordance with some embodiments. One or more operations illustrated in FIG. 2 may be modified, rearranged, or omitted altogether. Accordingly, the particular sequence of operations illustrated in FIG. 2 should not be construed as limiting the scope of one or more embodiments.

Referring to FIG. 2, at operation 202, the system receives a customer-defined custom view on a standard object, where changes to the standard object affect downstream systems, and where the custom view encapsulates selected fields of the standard object.

In this context, a "standard object" refers to a structured and predefined dataset within the data processing framework. It embodies a cohesive collection of data fields, each with specific attributes and functionalities. Typically representing a core entity or business concept, the standard object serves as a standardized representation of information that holds significance for various processes within the data system. This standardization ensures a consistent and uniform approach to data handling, fostering interoperability among different components of the system. The standard object, as introduced in operation 202 by the object module 110, acts as a central point of reference for downstream processes.

In some embodiments, a "standard object" may be differentiated from a "custom object" within the data processing system. A "standard object" in the data processing system is defined by the provider or maintainer of the system, serving as a pre-established and standardized dataset for utilization by customers of the data processing system. The provider of the system assumes responsibility for its definition and maintenance. In contrast, a "custom object" is uniquely defined by a customer of the data processing system for their exclusive use, with no involvement from the provider in its definition. The customer holds sole responsibility for the creation and maintenance of the custom object, tailoring it to their specific requirements. This clear demarcation establishes that while the provider governs the standard object's integrity and updates, the onus of defining and sustaining the custom object lies entirely with the customer, ensuring autonomy and customization in their data processing endeavors.

In one or more embodiments, a "custom view" refers to a tailored configuration of the standard object, personalized by a customer to meet their specific data processing requirements. The custom view may be a virtual representation of the standard object, encapsulating selectively chosen fields that align with the customer's operational focus. The custom view acts as a lens through which the customer interacts with the standard object, allowing them to filter and prioritize information according to their unique needs. For instance, in a standard object representing a dataset, a customer might define a custom view that includes only specific columns like "ID" and "Type," omitting other less relevant fields. This customization allows customers to focus on the information relevant to their distinct workflows.

As an illustrative example, consider a standard object table 'Employee' with columns such as 'EmployeeID,' 'Name,' 'Department,' 'Salary,' and 'PerformanceRating.' A customer, focused primarily on tracking employee performance, could create a custom view named 'PerformanceTracker' encapsulating only 'EmployeeID,' 'Name,' and 'PerformanceRating' columns. This custom view, tailored to the customer's needs, becomes a practical tool for efficiently managing and analyzing performance-related data without the clutter of unnecessary information. The flexibility of defining custom views ensures that customers can adapt their data representation to changing business requirements, enhancing the system's versatility and user-centric design.

In some embodiments, the customer defines the custom view through a user interface (hereinafter "UI") allowing specification of columns and mapping from the standard object to the custom view. In some embodiments, this UI serves as an intuitive tool, allowing users to specify the columns they want to include in their custom view and establish mappings from the standard object to the custom view. Through this UI, customers can seamlessly navigate and select from the available fields in the standard object, streamlining the customization process. In some embodiments, the interface provides a straightforward means for users to articulate their specific data representation requirements without delving into complex technicalities.

In some embodiments, the UI's functionality includes a straightforward column selection process, where customers can choose the desired columns from the standard object and arrange them within the custom view. Additionally, in some embodiments, customers can employ mapping features within the UI to establish relationships between the selected columns and their corresponding counterparts in the custom view. This mapping capability ensures the accurate alignment of data between the standard object and the custom view, maintaining consistency in the representation of information.

In some embodiments, the standard object is associated with a public API, and the customer-defined view is utilized for creating, updating, and querying the standard object through the public API. This facilitates the utilization of the custom view for CUD operations on the standard object through the public API. By linking the customer-defined view with the public API, the system enables customers to interact with and manipulate the standard object using their tailored data representation. This allows customers to make use of their custom views for various operations within the context of the standard object, enabling customers to conduct CUD operations effortlessly using the public API. Customers may thus not only interact with the standard object, but also manipulate its data according to their specific requirements.

In some embodiments, the custom view is adjustable through a user interface (hereinafter "UI") allowing customers to modify the encapsulated fields or mapping. Users can thus navigate and manipulate the custom view, adjusting the selection of fields or mapping to better align with their operational objectives. In some embodiments, this enables real-time adaptations to the custom view.

At operation 204, the system generates a replication object based on the customer-defined view, the replication object being configured to capture changes without storing actual data. The term "replication object," as employed in this context, refers to a specialized framework responsible for duplicating changes made to the standard object onto the customer-defined custom view without storing the actual data. In some embodiments, this replication object is strategically designed to capture changes introduced to the standard object without the necessity of storing the actual data. By focusing on capturing only the changes rather than the entire dataset, the replication object minimizes the impact on system resources while ensuring an accurate record of alterations to the standard object.

In some embodiments, a BLACKHOLE database engine within MySQL exemplifies a replication object, and may be utilized as such. A BLACKHOLE database engine maintaining a corresponding table operates as a unique storage engine that discards the data written into that table, serving as a lightweight, efficient solution for scenarios where data storage is not a primary concern. In the MySQL context, the BLACKHOLE storage engine functions by accepting data writes, but unlike other engines, it doesn't store the data. Instead, it immediately discards any data written to it, making it an ideal candidate for scenarios where the goal is to capture and replicate changes without the need for actual data storage. In the described operations, the replication module captures changes made to the standard object and replicate them onto the customer-defined custom view without the need to store redundant data.

In various embodiments, the replication object is implemented using a technology supporting change data capture (hereinafter "CDC"), selected from the group consisting of log-based replication, trigger-based replication, and transaction-based replication. Change data capture refers to the process of identifying and capturing changes made to data, ensuring that these changes are efficiently propagated to other parts of the system. In some embodiments, log-based replication involves capturing changes from the database's transaction log, providing an accurate record of alterations made to the standard object. This method offers a fine-grained approach to tracking changes, ensuring that every modification is reflected in the replication object and, consequently, the customer-defined custom view. In some embodiments, trigger-based replication operates by utilizing predefined triggers that activate in response to specific database events, such as CUD operations. Triggers initiate the replication process, ensuring that changes to the standard object trigger an immediate response in the replication object, maintaining synchronization with the custom view. In some embodiments, transaction-based replication focuses on capturing changes made within a transaction to ensure data consistency.

In some embodiments, the standard object is associated with a set of predefined rules governing the permissible alterations to the standard object, and the replication object enforces these rules during the capture of changes.

In some embodiments, the standard object is associated with a set of predefined rules governing the permissible alterations to the standard object, and the replication object enforces these rules during the capture of changes. The permissible rules establish a framework dictating the limits and conditions under which modifications to the standard object are deemed acceptable. The replication object enforces these predefined rules during the capture of changes. As alterations are made to the standard object, the replication object assesses each modification against the set rules, allowing only those changes that comply with the predefined standards to be captured.

In some embodiments, the replication object stores historical versions of the standard object and the customer-defined custom view. This functionality enables the system to track and store past states of the standard object and its associated custom view, creating a historical repository of alterations over time. In some embodiments, this enables users to refer back to previous states. Additionally, in some embodiments, this allows for recovery in case of inadvertent data modifications by providing a point-in-time snapshot of the standard object and custom view.

At operation 206, the system replicates CUD operations to the replication object. In some embodiments, the system performs this operation with application code that copies data from the standard object during CUD operations to the replication object, ensuring synchronization between the standard object and the customer-defined view on the standard object. The operation plays a role in the synchronization between the standard object and the customer-defined view. The system thus captures Create, Update, and Destroy operations on the standard table and ensures that these operations are promptly replicated to the replication object. In one or more additional or alternative embodiments, application code performing the CUD operations first determines that a custom view exists and must be supported, and then performs the CUD operations on the custom view as needed.

At decision point 208, the system evaluates whether CUD operations were performed on the custom view. If the system determines that CUD operations were performed on the custom view, signifying relevant changes to the standard object that have been replicated to the replication object, the process advances to operation 210, whereby the system enters the phase of emitting change logs from the replication object. On the other hand, if CUD operations were not performed on the custom view, the system proceeds to operation 214, whereby the system continues to monitor for CUD operations being performed on the custom view. This state remains active until the system determines that the operations were performed on the custom view, at which point the system transitions to operation 210. The continuous monitoring mechanism ensures that the system responds promptly to any changes in the standard object that warrant the generation of change logs.

At operation 210, the system emits change logs from the replication object in response to CUD operations on the standard table, wherein the change logs capture changes to the standard object. The emitted change logs serve as a precise and detailed account of modifications to the standard object, capturing the essence of each CUD operation. This granular level of documentation provides downstream processes with accurate and real-time information about the evolving state of the standard object. The change logs act as a bridge between the standard object and the subsequent stages of data processing, facilitating seamless communication and integration. The emission of change logs at this stage aligns with the system's goal of enabling real-time updates to the standard object. By promptly capturing and transmitting changes, the system ensures that downstream systems receive timely information. The emitted change logs, containing a detailed account of CUD operations, are prepared for transmission to a message bus in the subsequent operation. This ensures that the recorded changes are efficiently disseminated to downstream systems, allowing them to stay synchronized and adapt to the evolving state of the standard object in a real-time manner.

To illustrate, suppose a customer initiates an Update operation on a standard object, modifying the value of a specific field. In response to this action, the change logs generated by the system would encapsulate the relevant details, such as the type of the operation (Update), the unique identifier of the modified object, the previous value of the altered field, and the updated value. These change logs serve as a detailed historical record, enabling downstream systems to precisely comprehend the nature and scope of the alteration. Whether it's a Create, Update, or Destroy operation, the emitted change logs consistently provide a structured representation of the changes, ensuring clarity and accuracy in the subsequent stages of data processing.

In some embodiments, the system provides a cleanup mechanism for the database system to manage data associated with the replication object and prevent false messages from being emitted. This cleanup mechanism maintains the integrity of the data processing system by preventing the emission of false messages. As part of its operation, the cleanup mechanism identifies and rectifies any anomalies or discrepancies that may arise in the data associated with the replication object, ensuring that the change logs accurately reflect the state of the standard object. In some embodiments, the cleanup mechanism anticipates potential issues that could compromise the fidelity of the emitted change logs. By systematically addressing and rectifying these issues, the system ensures that downstream systems receive accurate and reliable information, thus facilitating seamless and error-free data processing. According to some embodiments, one example of the cleanup mechanism's functionality is the identification and removal of redundant or outdated data within the replication object. This ensures that only relevant and up-to-date information is transmitted via the change logs to the message bus.

At operation 212, the system transmits the change logs to a message bus for consumption by downstream systems. The message bus serves as a centralized communication channel, facilitating the dissemination of information to downstream systems. The transmission of change logs to the message bus enables updates to the standard object without disrupting the integrity of the customer-defined view. In some embodiments, the message bus is implemented using a technology capable of facilitating the publication of change logs and ensuring seamless integration with downstream systems. Upon transmitting the change logs, the system proceeds to Operation 214, where it continues to monitor for further CUD operations that have been performed on the custom view.

In some embodiments, downstream systems, configured to subscribe to the message bus, receive the transmitted change logs, allowing them to respond to alterations in the standard object. In some embodiments, this enables one or more real-time updates to the standard object without affecting the customer-defined view. This real-time updating capability enhances the overall adaptability and responsiveness of the system, ensuring that downstream processes remain synchronized with the latest changes to the standard object.

In some embodiments, the standard object is modified as part of an upgrade process, and the customer-defined view remains unaffected, preserving the integrity of the customer's business processes. In data processing systems, upgrades are inevitable for introducing enhancements, fixing bugs, or adapting to evolving requirements. During an upgrade process, standard objects may undergo changes in their structure or functionality to improve system performance or incorporate new features. Despite these modifications, the customer-defined view remains unaffected, acting as a protective layer that shields the customer's business processes from disruptions.

In some embodiments, the custom view facilitates the creation of messages on the message bus, providing a representation of changes to the standard object for downstream systems. In such embodiments, the custom view is not merely a passive representation of selected fields but actively enables the generation of messages on the message bus. This feature enhances the system's capability to provide a representation of changes to the standard object. This may be advantageous in scenarios where downstream systems rely on well-structured and contextual data for their operations. By facilitating the creation of messages on the message bus, the custom view is capable of translating changes to the standard object into a format optimized for downstream systems.

In some embodiments, the system receives a request, from a customer at a user interface, for a report on the standard object based on the customer-defined custom view, where the report includes data derived from the encapsulated fields of the standard object. The system then generates the report in response to the request, and transmits the report to one or more client devices. This allows for the ability to generate reports for the customer based on the customer-defined custom view. This functionality empowers customers to request tailored reports that are personalized to align with their information needs. The initiation of this process begins with a customer's request, communicated through a user interface, signaling the system to provide a report on the standard object. In some embodiments, reports can be generated in real-time upon a user selecting an option to generate a report, thereby submitting the request for the report. In some embodiments, the transmission of the generated report to one or more client devices allows for the customer to receive the report, and, potentially, one or more other users or entities of the customer's choice. In some embodiments, customers can select one or more options to receive the requested information in a format conducive to their client device or their preferences.

In some embodiments, the data processing system is implemented in a streaming API framework for real-time data transmission between the standard object and the custom view, enabling continuous updates to the custom view based on changes to the standard object. This steaming API framework transforms the data transmission mechanism between the standard object and the custom view, opting for a real-time streaming approach. The integration of a streaming API framework facilitates continuous and instantaneous data transmission between the standard object and the custom view. This is particularly useful in scenarios where the standard object undergoes frequent changes, as the streaming API ensures that these alterations are promptly reflected in the customer-defined custom view.

In some embodiments, the data processing system is implemented using one or more technologies to convert database binary logs into messages that are published onto the message bus. In some embodiments, the database binary logs capture detailed records of database transactions, including, e.g., Create, Update, and Destroy (CUD) operations. By employing one or more technologies for conversion, the system ensures that these binary logs are transformed into a structured and standardized format compatible with the message bus. This conversion process acts as a bridge between the internal database operations and the external communication infrastructure.

In some embodiments, the system alerts users or downstream systems of specific changes to the standard object captured in the change logs. In some embodiments, the alerting process is triggered based on predefined criteria or events deemed significant by users. For example, users can specify conditions such as, e.g., specific types of updates, modifications, or threshold values that, when met, trigger the notification. The system then generates alerts in real-time, promptly notifying relevant users or downstream systems about the nature of the change.

In some embodiments, the system generates a customizable report based on the customer-defined view. In some embodiments, users initiate this process through a user interface, where they have the flexibility to select and arrange fields from the customer-defined view that they want to include in the report. In some embodiments, the user interface provides options for customization, allowing users to specify, for example, the format, layout, and additional details they wish to incorporate into the report. Once the customization is defined through the user interface, the system generates the report based on the selected parameters.

4. Custom View Example

Figure 3:
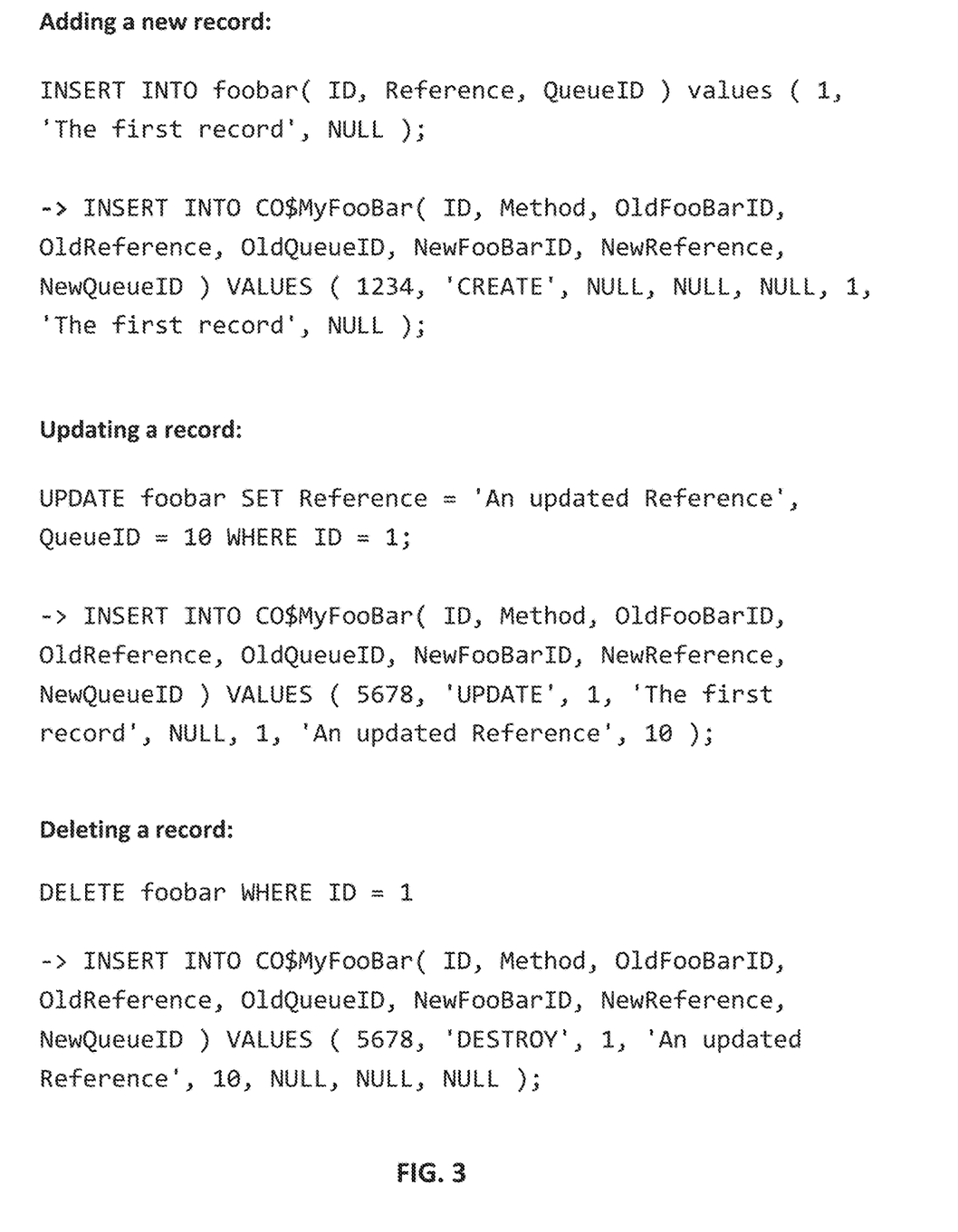
FIG. 3 illustrates an example of Create, Use, and Destroy operations being performed on a standard object in relation to a customer-defined custom view, in accordance with some embodiments.

FIG. 3 illustrates an example of Create, Use, and Destroy operations being performed on a standard object in relation to a customer-defined custom view, in accordance with some embodiments.

First, the system provides a defined standard object table 'foobar' to have the columns: ID as the primary key, Reference as varchar(255), and QueueID as an integer used to reference another table called 'queues'. The customer is only interested in the ID and Reference columns, so they define a custom view CO$MyFooBar which has columns ID as the ID of the CO$MyFooBar table, Method as varchar (10), OldFooBarID (mapped to foobar.ID), and OldFooBar-Reference (mapped to foobar.Reference), as well as New-FooBarID and NewFooBarReference, similarly mapped. In code or by a trigger, the system ensures that any changes to the foobar table are made to the custom view table. The "Old" and "New" columns are needed to capture the old values and the new values that happen during an UPDATE. For a CREATE request, the New values are populated. For a DESTROY request, the Old values are populated.

An illustration of what might happen at the database level is shown through example SQL statements in FIG. 3. First, adding a new record to 'foobar':
INSERT INTO foobar (ID, Reference, QueueID) values (1, 'The first record', NULL);
would cause via a trigger or code the following to happen:
INSERT INTO CO$MyFooBar(ID, Method, OldFooBarID, OldReference, OldQueueID, NewFooBarID, NewReference, NewQueueID) VALUES (1234, 'CREATE', NULL, NULL, NULL, 1, 'The first record', NULL);
The corresponding binary log messages for both tables would be emitted. Second, updating that existing record would emit:
UPDATE foobar SET Reference='An updated Reference', QueueID=10 WHERE ID=1;
and would cause via a trigger or code the following to happen:
INSERT INTO CO$MyFooBar (ID, Method, OldFooBarID, OldReference, OldQueueID, NewFooBarID, NewReference, NewQueueID) VALUES (5678, 'UPDATE', 1, 'The first record', NULL, 1, 'An updated Reference', 10);
The corresponding binary log messages for both tables would be emitted. Third, deleting a record:
DELETE foobar WHERE ID=1
would cause via a trigger or code the following to happen:
INSERT INTO CO$MyFooBar(ID, Method, OldFooBarID, OldReference, OldQueueID, New FooBarID, NewReference, NewQueueID) VALUES (5678, 'DESTROY', 1, 'An updated Reference', 10, NULL, NULL, NULL);
In some embodiments, the primary key ID in the CO$MyFooBar table is immaterial since the table never stores anything. As such, any random value would be acceptable, or alternatively, using an auto-increment primary key could be used.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
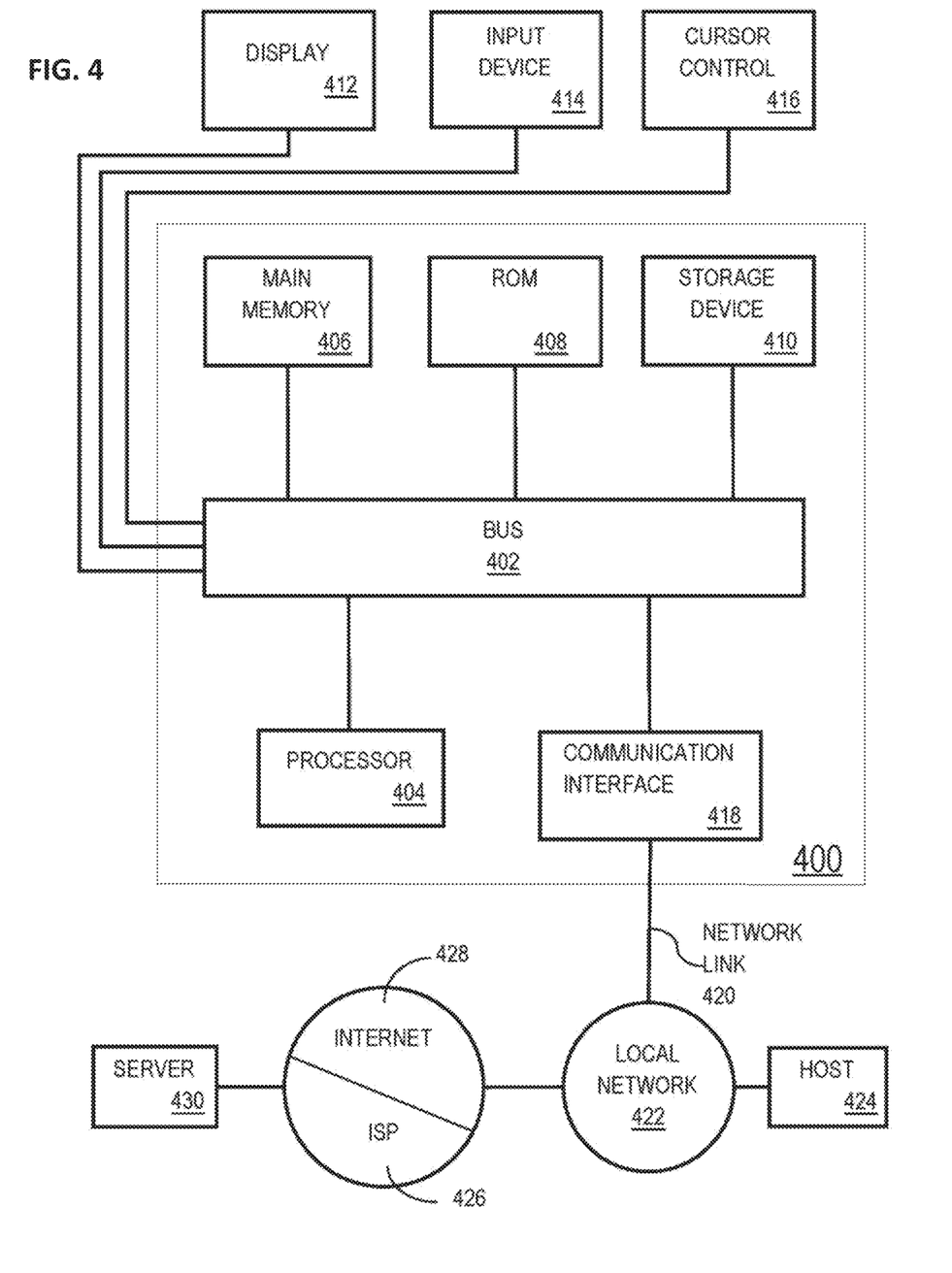
FIG. 4 illustrates a computer system upon which some embodiments may be implemented.

For example, FIG. 4 illustrates a computer system upon which some embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A non-transitory computer-readable medium including instructions that, when executed by one or more hardware processors, cause performance of operations comprising:
   receiving a customer-defined custom view on a standard object, wherein changes to the standard object affect downstream systems, and wherein the custom view encapsulates selected fields of the standard object;
   generating a replication object based on the customer-defined view, wherein the replication object captures changes without storing data, wherein generating the replication object is triggered by the changes to the standard object;
   replicating Create, Update, and Destroy (CUD) operations to the replication object to synchronize between the standard object and the customer-defined view on the standard object;
   emitting change logs from the replication object in response to the CUD operations, wherein the change logs capture changes to the standard object; and
   transmitting the change logs to a message bus for consumption by the downstream systems.

2. The non-transitory computer-readable medium of claim 1, wherein the replication object is implemented using a technology supporting change data capture, selected from the group consisting of log-based replication, trigger-based replication, and transaction-based replication.

3. The non-transitory computer-readable medium of claim 1, wherein the customer defines the custom view through a user interface (UI) allowing specification of columns and mapping from the standard object to the custom view.

4. The non-transitory computer-readable medium of claim 1, wherein the message bus is implemented using a technology that facilitates the publication of change logs and ensures seamless integration with downstream systems.

5. The non-transitory computer-readable medium of claim 1, wherein the instructions further cause performance of operations comprising:
   providing a cleanup mechanism for the database system to manage data associated with the replication object and prevent false messages from being emitted.

6. The non-transitory computer-readable medium of claim 1, wherein the standard object is associated with a public Application Programming Interface (API), and the customer-defined view is utilized for creating, updating, and querying the standard object through the public API.

7. The non-transitory computer-readable medium of claim 1, wherein the standard object is modified as part of an upgrade process, and the customer-defined view remains unaffected, preserving the integrity of the customer's business processes.

8. The non-transitory computer-readable medium of claim 1, wherein the custom view facilitates the creation of messages on the message bus to provide a representation of changes to the standard object for downstream systems.

9. The non-transitory computer-readable medium of claim 1, wherein the replication object is a log-based replication object, and the change logs are generated and transmitted for replication without storing actual data, maintaining data consistency between the standard object and the customer-defined view.

10. The non-transitory computer-readable medium of claim 1, wherein the instructions further cause performance of operations comprising:
    receiving a request, from a customer at a user interface, for a report on the standard object based on the customer-defined custom view, wherein the report comprises data derived from the encapsulated fields of the standard object;
    generating the report in response to the request; and
    transmitting the report to one or more client devices.

11. The non-transitory computer-readable medium of claim 1, wherein the data processing system is implemented in a streaming API framework for real-time data transmission between the standard object and the custom view, enabling continuous updates to the custom view based on changes to the standard object.

12. The non-transitory computer-readable medium of claim 1, wherein the data processing system is implemented using one or more technologies to convert database binary logs into messages that are published onto the message bus.

13. A method comprising:
    receiving a customer-defined custom view on a standard object, wherein changes to the standard object affect downstream systems, and wherein the custom view encapsulates selected fields of the standard object;
    generating a replication object based on the customer-defined view, wherein the replication object captures changes without storing data, wherein generating the replication object is triggered by the changes to the standard object;
    replicating Create, Update, and Destroy (CUD) operations to the replication object to synchronize between the standard object and the customer-defined view on the standard object;

emitting change logs from the replication object in response to the CUD operations, wherein the change logs capture changes to the standard object; and transmitting the change logs to a message bus for consumption by the downstream systems.

14. The method of claim 13, wherein the standard object is associated with a set of predefined rules governing the permissible alterations to the standard object, and the replication object enforces these rules during the capture of changes.

15. The method of claim 13, wherein the custom view is adjustable through a UI allowing customers to modify the encapsulated fields or mapping.

16. The method of claim 13, wherein the change logs are transmitted in real time in response to the CUD operations.

17. The method of claim 13, wherein the replication object stores historical versions of the standard object and the customer-defined custom view.

18. The method of claim 13, further comprising:
alerting users or downstream systems of specific changes to the standard object captured in the change logs.

19. The method of claim 13, further comprising:
generating a customizable report based on the customer-defined view.

20. A system comprising:
at least one device including a hardware processor;
the system being configured to perform operations comprising:
receiving a customer-defined custom view on a standard object, wherein changes to the standard object affect downstream systems, and wherein the custom view encapsulates selected fields of the standard object;
generating a replication object based on the customer-defined view, wherein the replication object captures changes without storing data, wherein generating the replication object is triggered by the changes to the standard object;
replicating Create, Update, and Destroy (CUD) operations to the replication object to synchronize between the standard object and the customer-defined view on the standard object;
emitting change logs from the replication object in response to the CUD operations, wherein the change logs capture changes to the standard object; and
transmitting the change logs to a message bus for consumption by the downstream systems.

* * * * *